(12) United States Patent
D'Sa et al.

(10) Patent No.: US 10,393,602 B2
(45) Date of Patent: Aug. 27, 2019

(54) TENSION MEASURING DEVICE

(71) Applicants: Joseph D'Sa, Woodbury, MN (US); Ruben D'Sa, Woodbury, MN (US)

(72) Inventors: Joseph D'Sa, Woodbury, MN (US); Ruben D'Sa, Woodbury, MN (US)

( * ) Notice: Subject to any disclaimer, the term of this patent is extended or adjusted under 35 U.S.C. 154(b) by 0 days.

(21) Appl. No.: 15/923,716

(22) Filed: Mar. 16, 2018

(65) Prior Publication Data
US 2018/0266904 A1 Sep. 20, 2018

Related U.S. Application Data

(60) Provisional application No. 62/472,750, filed on Mar. 17, 2017.

(51) Int. Cl.
*G01L 5/00* (2006.01)
*G01L 5/04* (2006.01)

(52) U.S. Cl.
CPC .................... *G01L 5/047* (2013.01)

(58) Field of Classification Search
CPC ..... A61N 1/372; G01F 23/2963; G01F 23/30; G01F 23/72; G01N 1/10; A61B 2562/0247; G01L 5/047
USPC ...................................................... 73/862.42
See application file for complete search history.

(56) References Cited

U.S. PATENT DOCUMENTS

| | | | |
|---|---|---|---|
| 4,262,763 A * | 4/1981 | Raskin | B07C 5/165 177/211 |
| 4,326,424 A | 4/1982 | Koenig | |
| 4,665,621 A * | 5/1987 | Ackerman | G01D 5/36 33/513 |
| 4,993,428 A | 2/1991 | Arms | |
| 5,095,252 A * | 3/1992 | Kurth | H05B 41/34 315/200 A |
| 5,289,826 A | 3/1994 | Kovacevic | |
| 5,332,316 A * | 7/1994 | Kleinerman | G01K 11/32 250/227.18 |
| 5,433,116 A | 7/1995 | Ahlstrom et al. | |
| 5,835,977 A * | 11/1998 | Kamentser | G01L 5/223 73/862.05 |
| 5,877,434 A | 3/1999 | Sturm | |
| 5,980,246 A | 11/1999 | Ramsay et al. | |
| 6,050,937 A | 4/2000 | Benderev | |
| 6,274,953 B1 | 8/2001 | Hwang et al. | |
| 6,487,906 B1 | 12/2002 | Hock | |
| 6,682,475 B2 | 1/2004 | Cox et al. | |
| 7,313,975 B1 | 1/2008 | Scorteanu | |
| 7,575,602 B2 | 8/2009 | Amirouche et al. | |
| 7,578,821 B2 | 8/2009 | Fisher et al. | |
| 7,591,854 B2 | 9/2009 | Wasielewski | |
| 8,068,648 B2 | 11/2011 | DiSilvestro et al. | |
| 8,656,790 B2 | 2/2014 | Amirouche | |

(Continued)

*Primary Examiner* — Max H Noori
(74) *Attorney, Agent, or Firm* — Brooks, Cameron & Huebsch, PLLC

(57) ABSTRACT

The present disclosure includes devices and method for measuring tension in a test object. An example device includes a probe configured to exert a force upon a test object at a particular location, a sensor that detects the force that the probe exerts upon the test object, and a switch that signals the sensor indicating the test object has been displaced a particular distance and/or angle, such that the sensor measures the force at a time when the test object has been displaced the particular distance and/or angle.

18 Claims, 17 Drawing Sheets

(56) References Cited

U.S. PATENT DOCUMENTS

| | | |
|---|---|---|
| 9,023,050 B2 | 5/2015 | Lang et al. |
| 9,060,713 B2 | 6/2015 | Rajamani et al. |
| 9,259,179 B2 | 2/2016 | Stein |
| 9,364,169 B2 | 6/2016 | West et al. |
| 9,408,615 B2 | 8/2016 | Fitz et al. |
| 9,439,767 B2 | 9/2016 | Bojarski et al. |
| 9,456,769 B2 | 10/2016 | Stein et al. |
| 9,492,116 B2 | 11/2016 | Stein |
| 9,492,929 B1 * | 11/2016 | Strauss .................... B25J 15/10 |
| 9,527,675 B2 | 12/2016 | Tout et al. |
| 9,549,809 B2 | 1/2017 | Tepic et al. |
| 2002/0033841 A1 * | 3/2002 | Rosenberg .............. A63F 13/06 715/701 |
| 2003/0030621 A1 * | 2/2003 | Rosenberg .............. A63F 13/06 345/156 |
| 2008/0184819 A1 | 8/2008 | Morimoto |
| 2012/0041345 A1 | 2/2012 | Rajamani et al. |
| 2013/0238257 A1 | 9/2013 | Rajamani et al. |
| 2013/0338627 A1 | 12/2013 | Rylander et al. |

* cited by examiner

TENSION MEASURING DEVICE

PRIORITY INFORMATION

This application claims benefit of U.S. Provisional Application No. 62/472,750 filed Mar. 17, 2017, the specification of which is incorporated herein by reference.

TECHNICAL FIELD

The present disclosure relates generally to a tension measuring device, and more particularly, to a tension measuring device for measuring tension in a test object at a particular location.

BACKGROUND

Measuring tension is a common operation performed on materials. A variety of tension meters have been developed over the years for this purpose. The devices can have a probe that exerts a force upon the material to be measured and two arms that contact or grasp the material on opposing sides of the probe. Other devices can use two or more sensors to calculate the tension of an elongate member, such as soft tissue in a body. The tension is determined from the force exerted upon the sensors and the displacement of the test object. While these devices may measure tension, they require a plurality of parts to contact the test object, such as arms and multiple sensors, to achieve the measurement. Also, some devices contact or secure the test object on opposing sides of the probe. The devices that contact the test object in a plurality of locations to measure tension are difficult to use in environments where access to the test object is concealed or encumbered.

DETAILED DESCRIPTION

Figure 1:
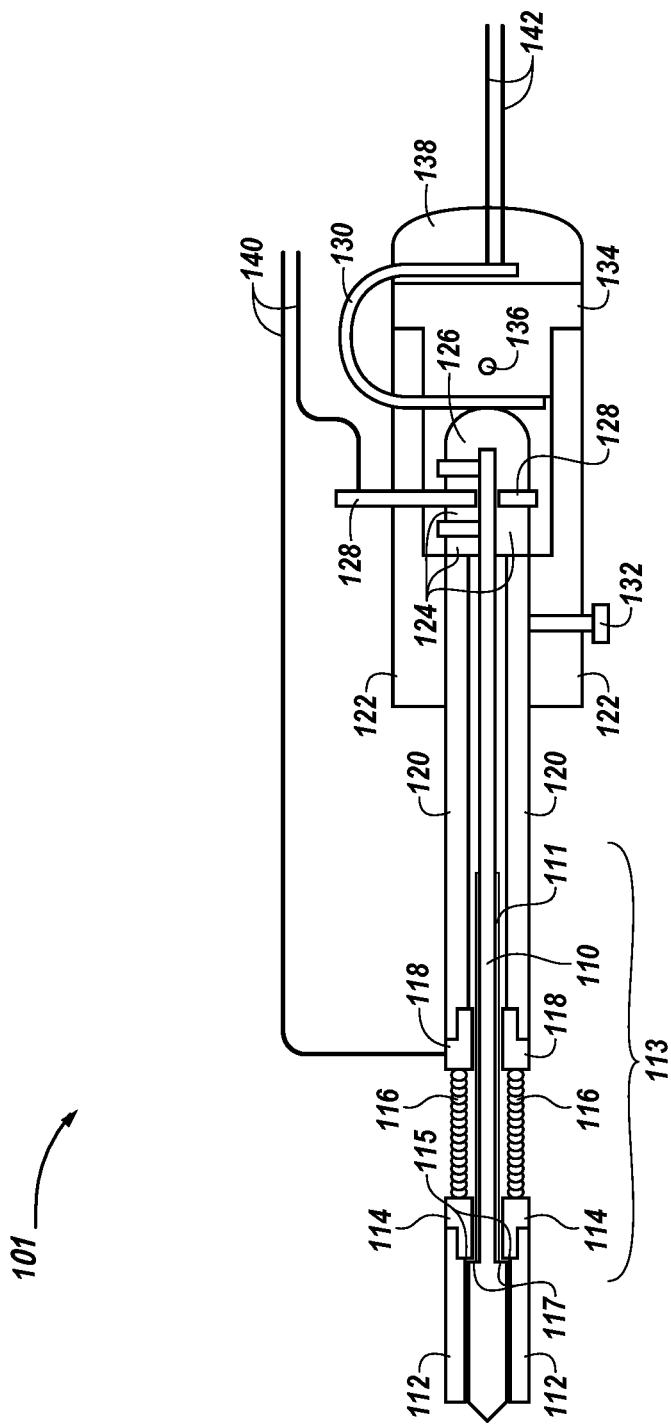
FIG. 1 is a section view schematic diagram of a tension measuring device in accordance with a number of embodiments of the present disclosure.

The present disclosure includes devices and method for measuring tension in a test object. An example device includes a probe configured to exert a force upon a test object at a particular location, a sensor that detects the force that the probe exerts upon the test object, and a switch that signals the sensor indicating the test object has been displaced a particular distance, such that the sensor measures the force at a time when the test object has been displaced the particular distance.

In a number of embodiments, the tension measuring device can include a probe that contacts a test object to measure a local tension at a particular location of the test object. The tension measuring device can measure the tension of the test object at the location where the probe contacts the test object, which can allow the device to measure tension in a manner that is less obtrusive and invasive than other devices that contact a test object at multiple locations to measure tension. The tension of the test object can correlate the force exerted on the test object by the test measurement device to displace the test object. Also, the local tension of the test object measured by the device can correlate to the overall tension of the test object based on the dimensions of the test object.

In a number of embodiments, the tension measuring device can be configured to take a measurement when the probe has displaced the test object a particular distance. The device can include a switch that can be contacted by the test object once it has been displaced the particular distance. The switch can be configured to take a measurement by opening an electrical connection between the probe and the switch. The switch can also be a proximity switch, a capacitive switch, a magnetic switch, an optical switch, and/or a hall effect switch that indicate a test measurement should be taken in response to the test object being displaced a particular distance.

In a number of embodiments, a tension measuring device can include a plurality of switches. Each of the plurality of switches can indicate that corresponding measurements should be taken when each of the plurality of switches are activated (e.g., the portion of the test object in contact with a particular switch has been displaced the particular distance). The plurality of measurements can then be correlated to the local tension of the test object at the location where the probe contacts the test object. A plurality of switches can be used to make a plurality of measurements to more accurately determine the tension of the test object when the probe contacts the test object at an angle that is not orthogonal to the surface of the test object.

It is to be understood that the terminology used herein is for the purpose of describing particular embodiments only, and is not intended to be limiting. As used herein, the singular forms "a", "an", and "the" can include both singular and plural referents, unless the context clearly dictates otherwise. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically or for access to and movement of the surgical reloadable cartridge assembly, as appropriate to the context.

The figures herein follow a numbering convention in which the first digit or digits correspond to the figure number and the remaining digits identify an element or component in the figure. Similar elements or components between different figures may be identified by the use of similar digits. For example, 110 may reference element "10" in FIG. 1, and a similar element may be referenced as 410 in FIG. 4. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a section view schematic diagram of a tension measuring device in accordance with a number of embodiments of the present disclosure. The tension measuring device 101 in FIG. 1 can be configured to contact a test object at single location, with an end of probe 110, and determine a tension in the test object at that single location. A probe can be a solid object that is sized and adapted to exert a force upon another solid object (e.g. test object) for purposes of measuring tension of the another solid object. The tension measuring device 101 can include probe 110 and a switch 113. Switch 113 can be used to indicated when the tension measuring device takes a measurement. A switch can be a number of parts configured to send a signal to an element (e.g., controller 2470 in FIG. 24) in response to an input from a first object. Switch 113 can include a switch trigger 112. Switch trigger 112 can annularly surround a portion of probe 110. Switch trigger 112 can be coupled to switch trigger contact 114. The switch trigger contact 114 can be coupled to switch spring 116 and switch spring 116 can be coupled to switch trigger contact 118. Switch trigger 112, switch trigger contact 114, and switch spring 116 can be configured to be displaced toward the proximal end of the tension measuring device 101, while switch trigger contact 118 and probe enclosure 120 are stationary, when the switch trigger 112 contact the test object. Surface 115 of switch trigger contact 114 can disengage with surface 117 of probe when the test object contacts the switch trigger 112 to displace switch trigger 112, switch trigger contact 114, and switch spring 116 toward the proximal end of the tension measuring device 101. Surface 115 disengaging from surface 117 can open an electrically conductive path which an indicate to circuitry (e.g., controller 2470 in FIG. 24) of the device to take a measurement. Switch triggers 114 and 118 and switch spring 116 can be insulated from probe 110 by probe insulation 111.

Tension measuring device 101 can include probe enclosure 120, that annularly surrounds probe 110, and is coupled to probe enclosure connector 122. Screw 132 can be used to secure probe enclosure 120 to probe enclosure connector 122. Probe 110 can be coupled to collar 124 and collar 126 and to probe contact 128. Pin 136 can be used to secure probe enclosure 120 to collar 124. Probe contact 128 and switch trigger contact 118 can be coupled to switch cables 140. Switch cables 140 can transfer signals to circuitry (e.g., controller 2470 in FIG. 24) indicating when the tension measuring device 101 is to take a measurement.

Collar 126 can be coupled to sensor 130 and to probe 110. The force exerted on probe 110 by the test object can be transfer to the sensor 130 via collar 126. The force can be sensed by sensor 130 and a signal corresponding to the force can be transferred to circuitry (e.g., controller 2470 in FIG. 24) via sensor cables 142. A sensor can include a number of parts that are configured to evaluate the force that a probe exerts upon a test object. The signal corresponding to the force exerted on probe 110 can be processed by circuitry (e.g., controller 2470 in FIG. 24) to determine a local tension in the test object. The circuitry (e.g., controller 2470 in FIG. 24) can also determine an overall tension in the test object based upon the signal from sensor 130 and the dimensions of the test object. A first end of sensor 130 can be coupled sensor plug 134, which can be secured by sensor pin 136, and a second end of sensor 130 can be coupled to sensor strain relief 138.

Figure 2:
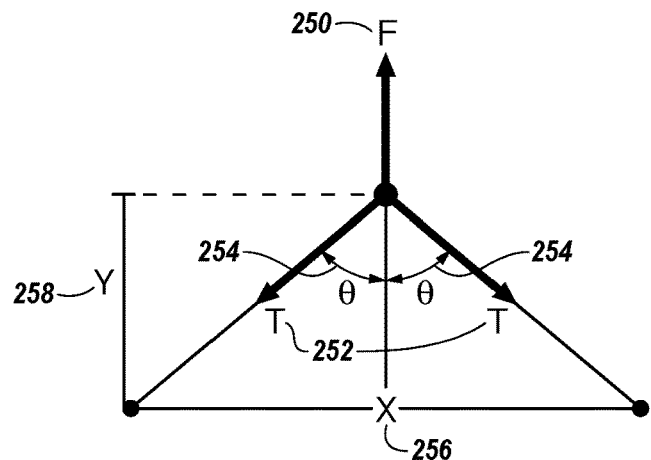
FIG. 2 is a force vector diagram for a tension measuring device in accordance with a number of embodiments of the present disclosure.

FIG. 2 is a force vector diagram for a tension measuring device in accordance with a number of embodiments of the present disclosure. In FIG. 2, a force (F) 250 can be exerted upon a test object, which causes tension (T) 252 in the test object. Tension 252 can be determined based on the following equation:

$$F = 2T \cos(\theta)$$

Force 250 can be measured by the tension measuring device via a sensor that correlates the force to an electrical signal and θ is determined based upon distance (x) 256 and distance (y) 258, which both can be known, where the following equation applies:

$$\cos(\theta) = \frac{2y}{\sqrt{x^2 + 4y^2}}$$

In a number of embodiments, distance 256 is the distance between opposite sides (e.g., the diameter) of the switch trigger (e.g., switch trigger 112 in FIG. 1) that contacts the test object and distance 258 is the distance that the surface of the test object is displaced by the probe.

Figure 3:
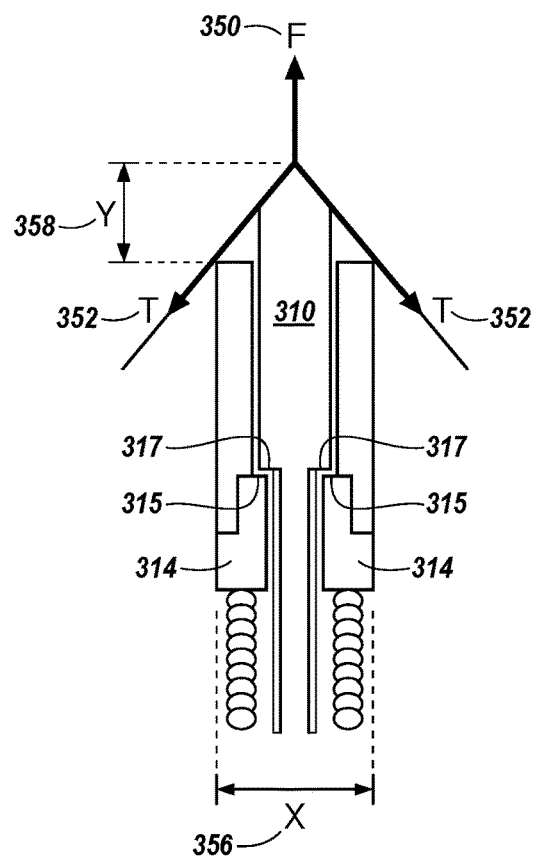
FIG. 3 is a force vector diagram on a tension measuring device in accordance with a number of embodiments of the present disclosure.

FIG. 3 is a force vector diagram on a tension measuring device in accordance with a number of embodiments of the present disclosure. Force 350 on the probe of the device can correlate to tension 352 in the test object as described above in association with FIG. 2. In a number of embodiments, the tension measuring device can use the known distances 356 and 358 and the measured force 350 using the probe and sensor to determine tension 352 in a test object. The measurement of the force can be made when surface 315 of switch trigger contact 314 is electrically and/or physically decoupled from surface 317 of the probe 318 (the gap between surfaces 315 and 317 is exaggerated in FIG. 3 to show that surface 315 and 317 are disengaged when the measurement is taken).

Figure 4:
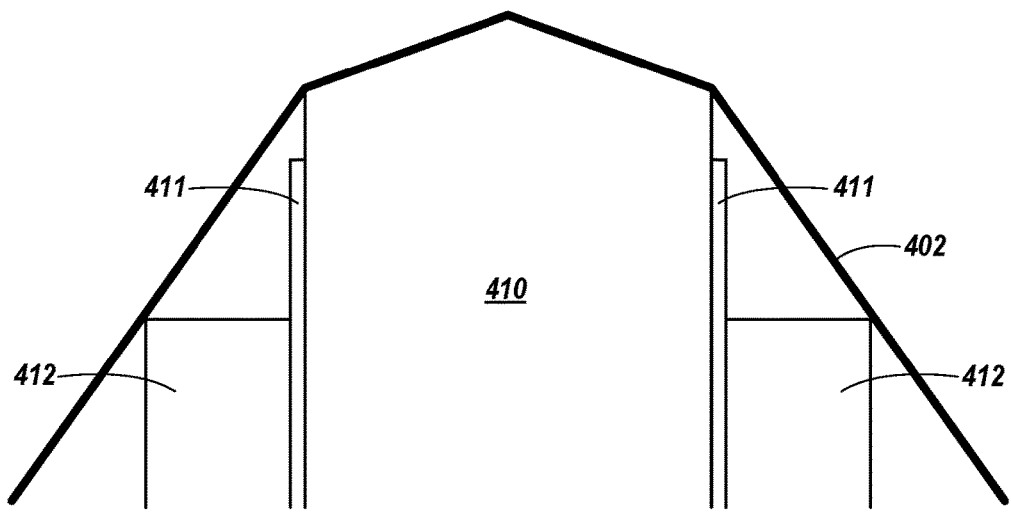
FIG. 4 is a section view schematic diagram of a contact end portion of a tension measuring device including probe insulation and a switch trigger in accordance with a number of embodiments of the present disclosure.

FIG. 4 is a section view schematic diagram of a contact end portion of a tension measuring device including probe insulation and a switch trigger in accordance with a number of embodiments of the present disclosure. In FIG. 4, probe 410 can be surrounded by probe insulation 411 to electrically insulate the probe from contacting the switch trigger 412 and the switch trigger contact (not shown, except at surfaces 115 and 117 in FIG. 1, when probe 410 is contacting test object 402.

Figure 5:
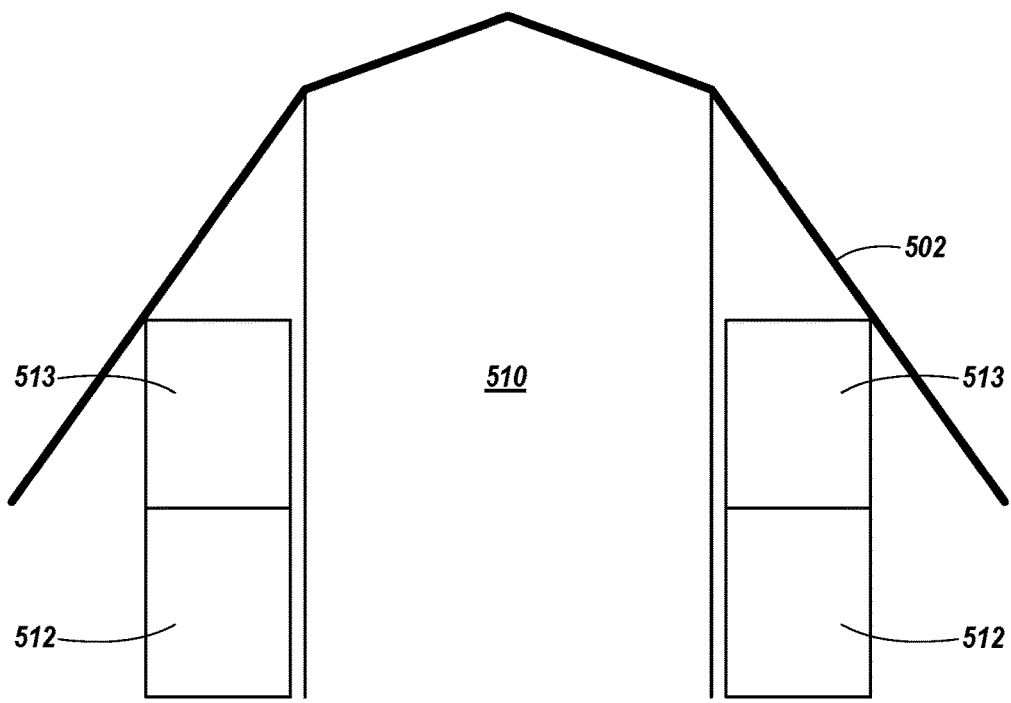
FIG. 5 is a section view schematic diagram of a contact end portion of a tension measuring device including a proximity sensor and a switch trigger in accordance with a number of embodiments of the present disclosure.

FIG. 5 is a section view schematic diagram of a contact end portion of a tension measuring device including a proximity sensor and a switch trigger in accordance with a number of embodiments of the present disclosure. In FIG. 5, the switch can include a proximity sensor 513 coupled to switch trigger 512 that can be configured to detect when the test object 502 contacts the proximity sensor 513 indicating that the test object has been displaced the particular distance (e.g., distance 258 in FIG. 2) and that the device should take a measurement.

Figure 6:
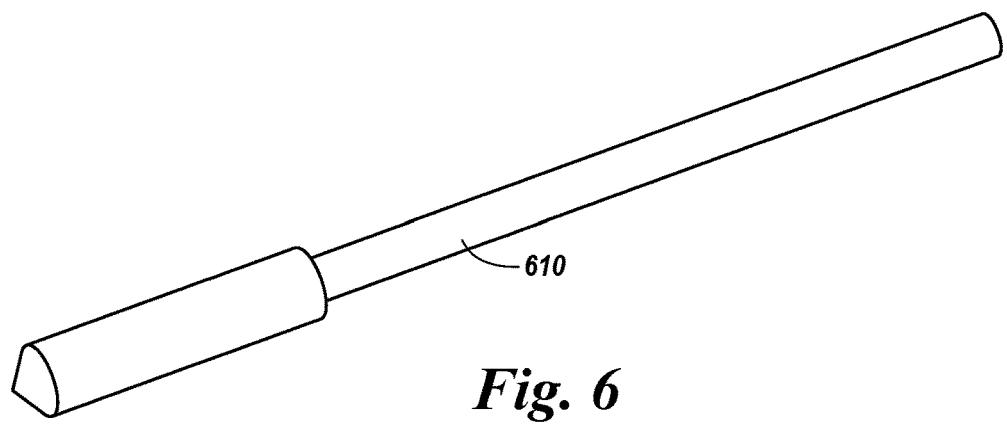
FIG. 6 is a schematic diagram of a probe on a tension measuring device in accordance with a number of embodiments of the present disclosure.

FIG. 6 is a schematic diagram of a probe on a tension measuring device in accordance with a number of embodiments of the present disclosure. Probe 610 may be formed of an electrically conducting material, such as brass, copper, silver gold, aluminum, stainless steel, and/or combinations thereof, for example. Probe 610 and may be configured to slide into the switch trigger/switch trigger contact. Probe 610 also may include materials that give the probe a flexible end. The probe may come in a variety of cross sections including circular, square, rectangular, triangular, and elliptical, among others for example. The diameter of probe 610 may be between about 1 mm to 25 mm and the length may be about 10 mm to about 200 mm. When a first end of probe 610 end is pressed against the surface of a test object, the probe 610 transmits the force from the first end of the probe to the sensor and probe 610 also can act as an electrical conduit for the switch.

Figure 7:
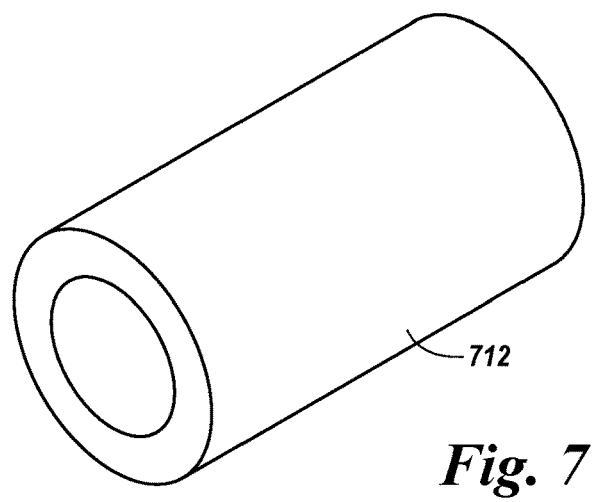
FIG. 7 is a schematic diagram of a switch trigger on a tension measuring device in accordance with a number of embodiments of the present disclosure.

FIG. 7 is a schematic diagram of a switch trigger on a tension measuring device in accordance with a number of embodiments of the present disclosure. Switch trigger 712 may be formed of a non-electrically conducting material such as a polymer and/or the trigger may be coated or isolated electrically from the probe. Switch trigger 712 may have an annular configuration, with a size slightly larger than the outside of the probe so that the trigger may freely move relative to the probe. Switch trigger 712 may be circular, rectangular, and/or triangular, among other configurations, in cross-section. The inner diameter of switch trigger 712 can be slightly larger than the outer shaft diameter. For example, inner diameter of switch trigger 712 can be about 1 millimeter (mm) to about 26 mm. The length of switch trigger 712 can be about 1 mm to 25 mm. Switch trigger 712 can be configured to keep the switch circuitry normally closed. When the probe end is pressed against a test object, and the test object touches the switch trigger 712 and a connection is opened between the probe and a switch trigger contact.

Figure 8:
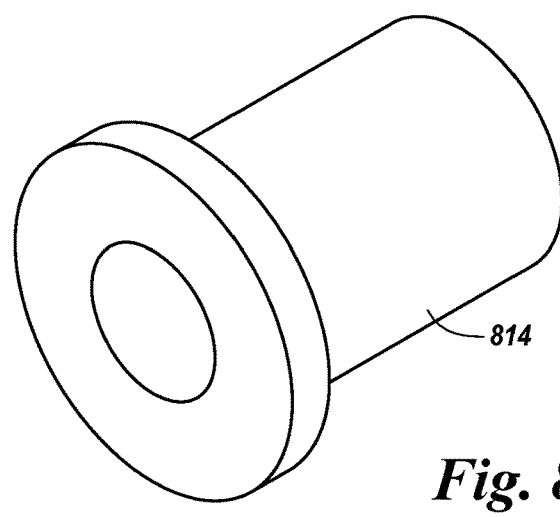
FIG. 8 is a schematic diagram of a switch trigger contact on a tension measuring device in accordance with a number of embodiments of the present disclosure.

FIG. 8 is a schematic diagram of a switch trigger contact on a tension measuring device in accordance with a number of embodiments of the present disclosure. Switch trigger contact 814 can be configured to create electrical continuity between the probe and the switch spring. Switch trigger contact 814 can be formed of an electrically conductive material, such as copper, brass, silver, gold, aluminum, stainless steel, and/or combinations thereof, for example. Switch trigger contact 814 can be press fitted, bonded, or molded into a switch trigger to form an integral component. The diameter of switch trigger contact 814 can be about 1 mm to about 25 mm and the length can be about 1 mm to 25 mm.

Figure 9:
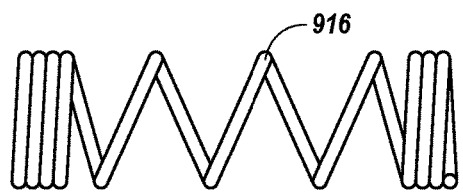
FIG. 9 is a schematic diagram of a switch spring on a tension measuring device in accordance with a number of embodiments of the present disclosure.

FIG. 9 is a schematic diagram of a switch spring on a tension measuring device in accordance with a number of embodiments of the present disclosure. Switch spring 916 may be formed of an electrically conductive material such as brass, stainless steel, copper, silver, gold, aluminum, and/or combinations thereof, for example. Switch spring 916 can be configured to slide over the probe. The inner or outer diameter of switch spring 916 can be about 1 mm to about 25 mm and the length can be about 25 mm to about 50 mm. The switch spring 916 can act as an electrical conduit between the two switch trigger contacts, one is assembled on the switch trigger and the other is assembled on the probe enclosure and maintains the switch in a normally closed configuration.

Figure 10:
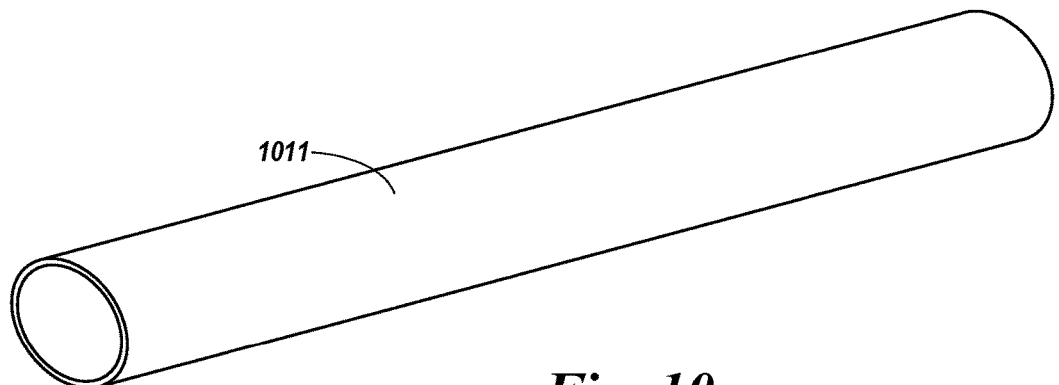
FIG. 10 is a schematic diagram of probe insulation on a tension measuring device in accordance with a number of embodiments of the present disclosure.

FIG. 10 is a schematic diagram of probe insulation on a tension measuring device in accordance with a number of embodiments of the present disclosure. Probe insulation 1011 may be provided to electrically isolate the probe from the switch spring. Probe insulation 1011 may comprise an electrically non-conducting material that is glued or otherwise attached to the probe. Its thickness should be great enough to achieve the desired insulation qualities and while the probe enclosure slides smoothly over the probe.

Figure 11:
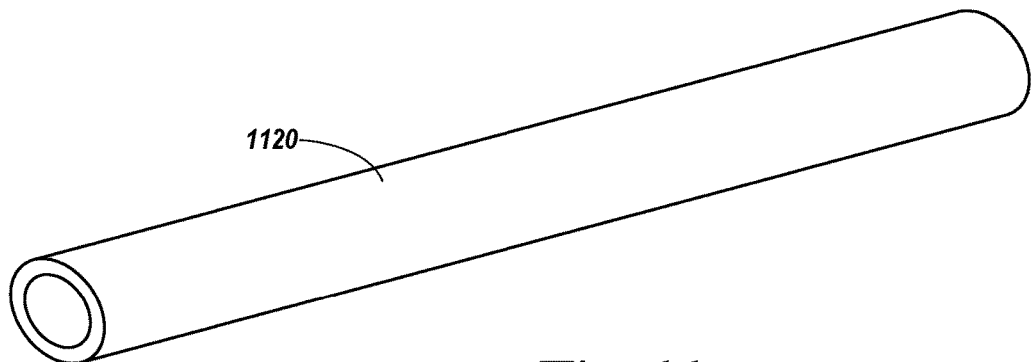
FIG. 11 is a schematic diagram of a probe enclosure on a tension measuring device in accordance with a number of embodiments of the present disclosure.

FIG. 11 is a schematic diagram of a probe enclosure on a tension measuring device in accordance with a number of embodiments of the present disclosure. Probe enclosure 1120 may comprise an electrically non-conducting material such as a polymer, for example. The switch trigger contact can be press fitted, bonded, or molded to the top end of probe enclosure 1120 to form an integral probe enclosure assembly. When the probe enclosure comprises an electrically conducting material, it should be coated on the inside to electrically isolate it from the probe. The probe enclosure 1120 can be fashioned to slideably reside over the probe, wherein the inner diameter of probe enclosure 1120 would therefore be larger than the outer diameter of the probe, and if circular is generally about 0.1 mm to 1 mm larger in diameter that the outer diameter of the probe. Relative to the probe, the probe enclosure would generally have a length of about 30% less than the probe.

Figure 12:
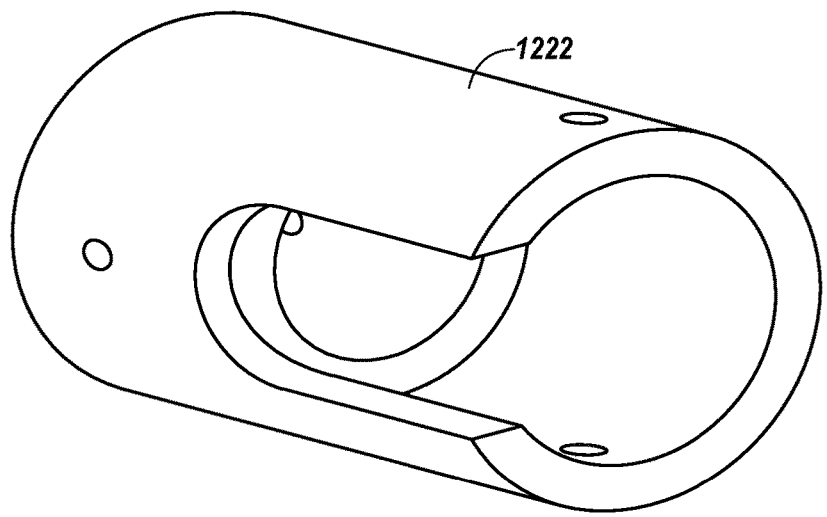
FIG. 12 is a schematic diagram of a probe enclosure connector on a tension measuring device in accordance with a number of embodiments of the present disclosure.

FIG. 12 is a schematic diagram of a probe enclosure connector on a tension measuring device in accordance with a number of embodiments of the present disclosure. The probe enclosure connector 1222 and the probe enclosure can be provided as an integral component. Probe enclosure connector 1222 can be about 40 mm in length and about 13 mm in diameter. In a number of embodiments, probe enclosure connector 1222 can be sized to cause the probe enclosure to have the force sensor contact the bottom collar.

Figure 13:
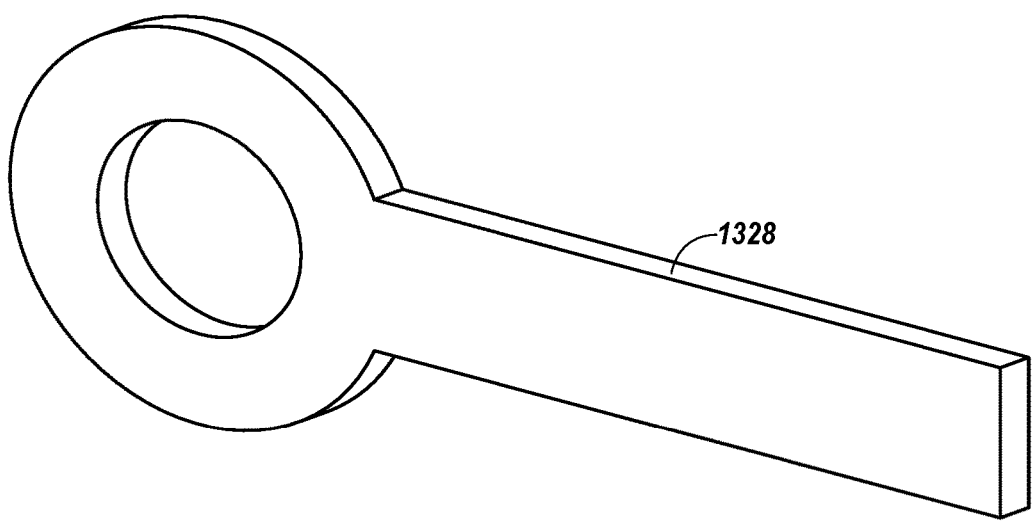
FIG. 13 is a schematic diagram of a probe contact on a tension measuring device in accordance with a number of embodiments of the present disclosure.

FIG. 13 is a schematic diagram of a probe contact on a tension measuring device in accordance with a number of embodiments of the present disclosure. Probe contact 1328 can be configured to provide an electrical connection to the probe. Probe contact 1328 may be formed of an electrically conductive material such as brass, stainless steel, copper, silver, gold, aluminum, and/or combinations thereof, for example. Probe contact 1328 can be configured to slideably reside over the probe at the probe end. The diameter of probe contact 1328 can be about 1 mm to about 25 mm, the length can be about 1 mm to about 25 mm, and the thickness can be about 0.1 mm to 2 mm.

Figure 14:
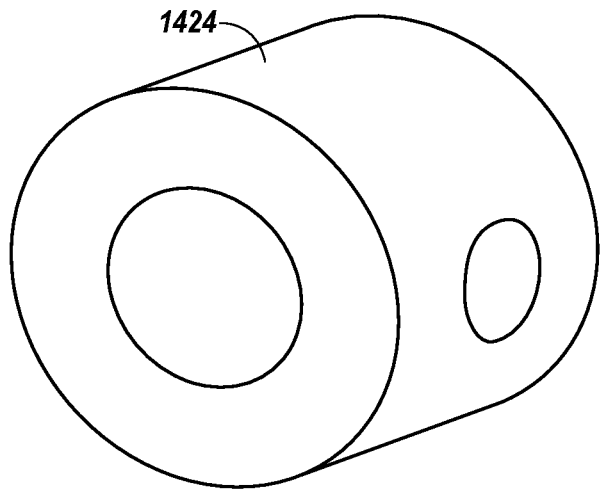
FIG. 14 is a schematic diagram of a first collar on a tension measuring device in accordance with a number of embodiments of the present disclosure.

FIG. 14 is a schematic diagram of a first collar on a tension measuring device in accordance with a number of embodiments of the present disclosure. A first collar 1424 for the probe may be attached to the probe to form an electrical connection. The electrical connection enables electrical continuity between the probe and the probe contact and a constraint for the location of the probe contact. The first collar 1424 may have an annular configuration to allow the probe to slide on the inner surface of the first collar 1424. The first collar 1424 may be formed of an electrically conductive material such as brass, stainless steel, copper, silver, gold, aluminum, and/or combinations thereof, for example. The first collar 1424 can be welded to the probe contact to form an inseparable assembly. This assembly may be secured to the probe using a set screw or other suitable means. The first collar 1424 can be secured to the probe end and can have an inner diameter of about 3 mm, an outer diameter of about 8 mm and a length of about 5 mm.

Figure 15:
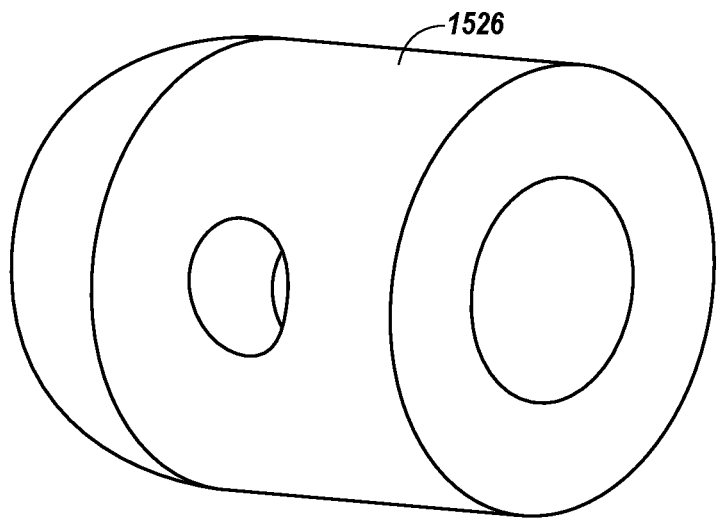
FIG. 15 is a schematic diagram of a second collar on a tension measuring device in accordance with a number of embodiments of the present disclosure.

FIG. 15 is a schematic diagram of a second collar on a tension measuring device in accordance with a number of embodiments of the present disclosure. A second collar 1526 may be provided to evenly deliver or distribute the force from the probe to the sensor. The second collar 1526 may be formed of an electrically conducting and/or non-conducting material. The second collar 1526 can be connected to the probe using a set screw. The second collar 1526 can have an outer diameter of about 8 mm and length of about 8 mm.

Figure 16:
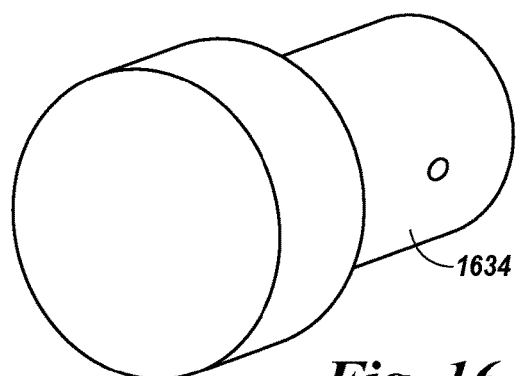
FIG. 16 is a schematic diagram of a sensor plug on a tension measuring device in accordance with a number of embodiments of the present disclosure.

FIG. 16 is a schematic diagram of a sensor plug on a tension measuring device in accordance with a number of embodiments of the present disclosure. Sensor plug 1634 may be provided to secure the sensor to the probe enclosure. The sensor plug 1634 may comprise either an electrically or non-electrically conducting material and may be configured to slide into the probe enclosure connector. The length and width of force sensor plug 1634 may vary to accommodate the probe enclosure connector and the sensor.

Figure 17:
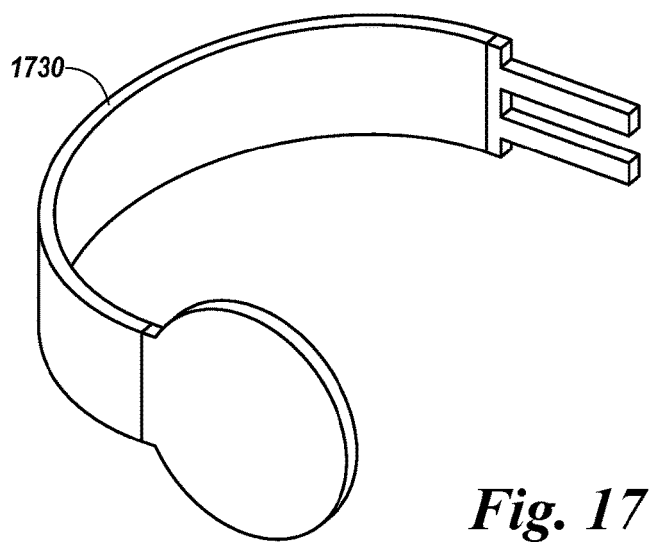
FIG. 17 is a schematic diagram of a sensor on a tension measuring device in accordance with a number of embodiments of the present disclosure.

FIG. 17 is a schematic diagram of a sensor on a tension measuring device in accordance with a number of embodiments of the present disclosure. Sensor 1730 may be provided to detect the force that the probe exerts upon the material whose tension is being measured. Sensor 1730 can be a hall effect sensor, a capacitive sensor, a proximity sensor, a magnetic sensor, a piezoresistive sensor, and/or an optical sensor, among other sensor types. In an embodiment with a piezoresistive sensor, variations in the resistance of the sensor can be correlated to the forces received at the probe end to allow a display on the device to indicate the actual force in the desired units. When the device is assembled, the sensor 1730 can be attached to force sensor plug to form an integral assembly therewith.

Figure 18:
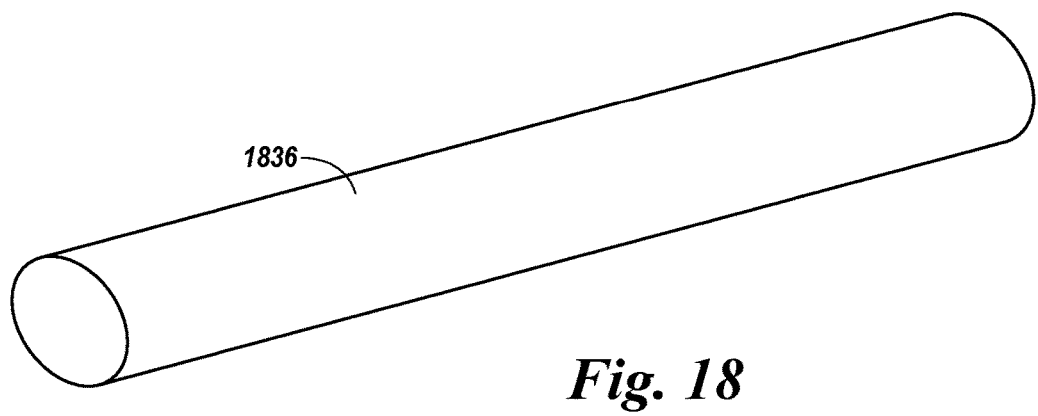
FIG. 18 is a schematic diagram of a sensor plug pin on a tension measuring device in accordance with a number of embodiments of the present disclosure.

FIG. 18 is a schematic diagram of a sensor plug pin on a tension measuring device in accordance with a number of embodiments of the present disclosure. Sensor plug pin 1836 can be provided to secure the sensor/sensor plug assembly to the probe enclosure connector. The sensor plug pin can be electrically or non-electrically conducting.

Figure 19:
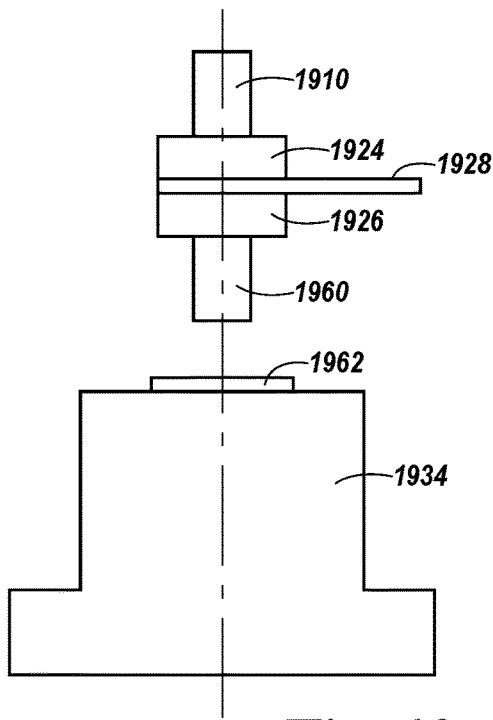
FIG. 19 is a section view schematic diagram of a probe and Hall effect sensor on a tension measuring device in accordance with a number of embodiments of the present disclosure.

FIG. 19 is a section view schematic diagram of a probe and Hall effect sensor on a tension measuring device in accordance with a number of embodiments of the present disclosure. In FIG. 19, probe 1910 can be coupled to collar 1924, probe contact 1928 and collar 1926. Collar 1926 can be configured to transfer forces from probe 1910 to magnet 1960, which can move in relation to the hall effect sensor 1962. The hall effect sensor 1962 can detect changes in voltage that correlate to the change in force on the probe 1910. A signal that correlates to the change in force on the probe 1910 based on the movement of magnet 1960 in relation to hall effect sensor 1962.

Figure 20:
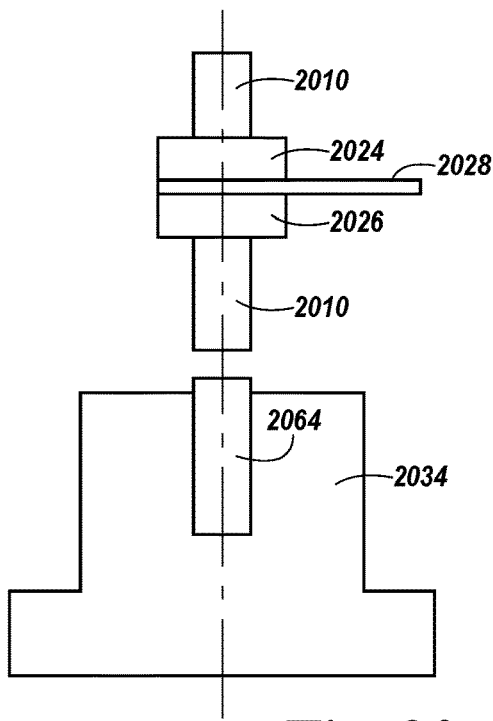
FIG. 20 is a section view schematic diagram of a probe and a proximity sensor on a tension measuring device in accordance with a number of embodiments of the present disclosure.

FIG. 20 is a section view schematic diagram of a probe and a proximity sensor on a tension measuring device in accordance with a number of embodiments of the present disclosure. In FIG. 20, probe 2010 can be coupled to collar 2024, probe contact 2028 and collar 2026. Probe 2010 can be configured to move in relation to proximity sensor 2064 based upon the force exerted on probe 2010. Proximity sensor 2064 can send out a signal that correlates to the change in force on the probe 2010 based on the distance between probe 2010 and proximity sensor 2064.

Figure 21:
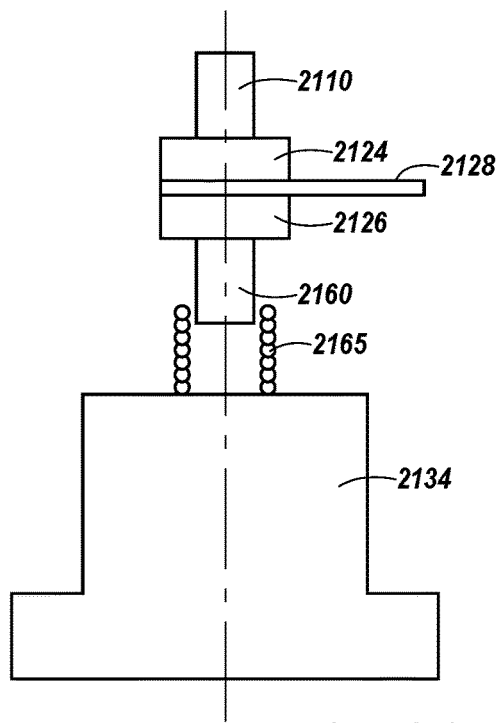
FIG. 21 is a section view schematic diagram of a probe and inductive coil sensor on a tension measuring device in accordance with a number of embodiments of the present disclosure.

FIG. 21 is a section view schematic diagram of a probe and inductive coil sensor on a tension measuring device in accordance with a number of embodiments of the present disclosure. In FIG. 21, probe 2110 can be coupled to collar 2124, probe contact 2128 and collar 2126. Collar 2126 can be configured to transfer forces from probe 2110 to magnet 2160, which can move in relation to the induction coil 2165. The induction coil 2165 can detect changes in voltage that correlate to the change in force on the probe 2110 based on movement of magnet 2160. A signal can be sent that correlates to the change in force on the probe 2110 based on the movement of magnet 2160 in relation to induction coil 2165.

Figure 22:
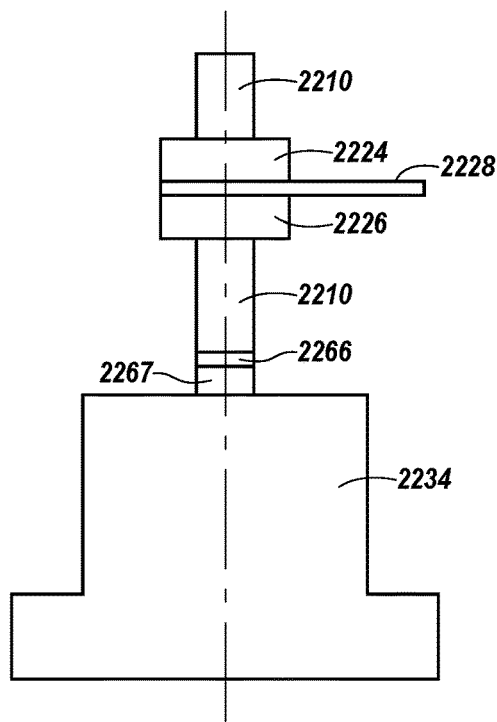
FIG. 22 is a section view schematic diagram of a probe and piezocapacitive sensor on a tension measuring device in accordance with a number of embodiments of the present disclosure.

FIG. 22 is a section view schematic diagram of a probe and piezocapacitive sensor on a tension measuring device in accordance with a number of embodiments of the present disclosure. In FIG. 22, probe 2210 can be coupled to collar 2224, probe contact 2228 and collar 2226. Probe 2210 can be configured to move in relation to piezocapacitive material 2266 and conductive disc 2267 based upon the force exerted on probe 2010. The piezocapacitive sensor can send out a signal that correlates to the change in force on the probe 2210 based upon an electrical characteristic of the piezocapacitive material 2266 that is dependent on the force on the probe 2210.

Figure 23:
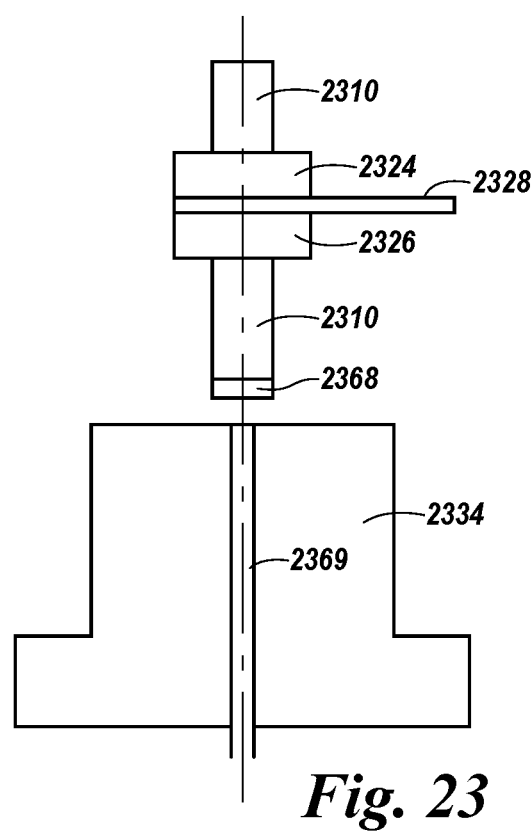
FIG. 23 is a section view schematic diagram of a probe and an optical sensor on a tension measuring device in accordance with a number of embodiments of the present disclosure.

FIG. 23 is a section view schematic diagram of a probe and an optical sensor on a tension measuring device in accordance with a number of embodiments of the present disclosure. In FIG. 23, probe 2310 can be coupled to collar 2324, probe contact 2328 and collar 2326. Probe 2310 can be coupled to reflective disc 2368 and probe 2310 and reflective disc 2368 can be configured to move in relation to light conducting fiber 2369 based upon the force exerted on probe 2310. The optical sensor can send out a signal that correlates to the change in force on the probe 2310 based on the distance between reflective disc 2368 and light conducting fiber 2369.

Figure 24:
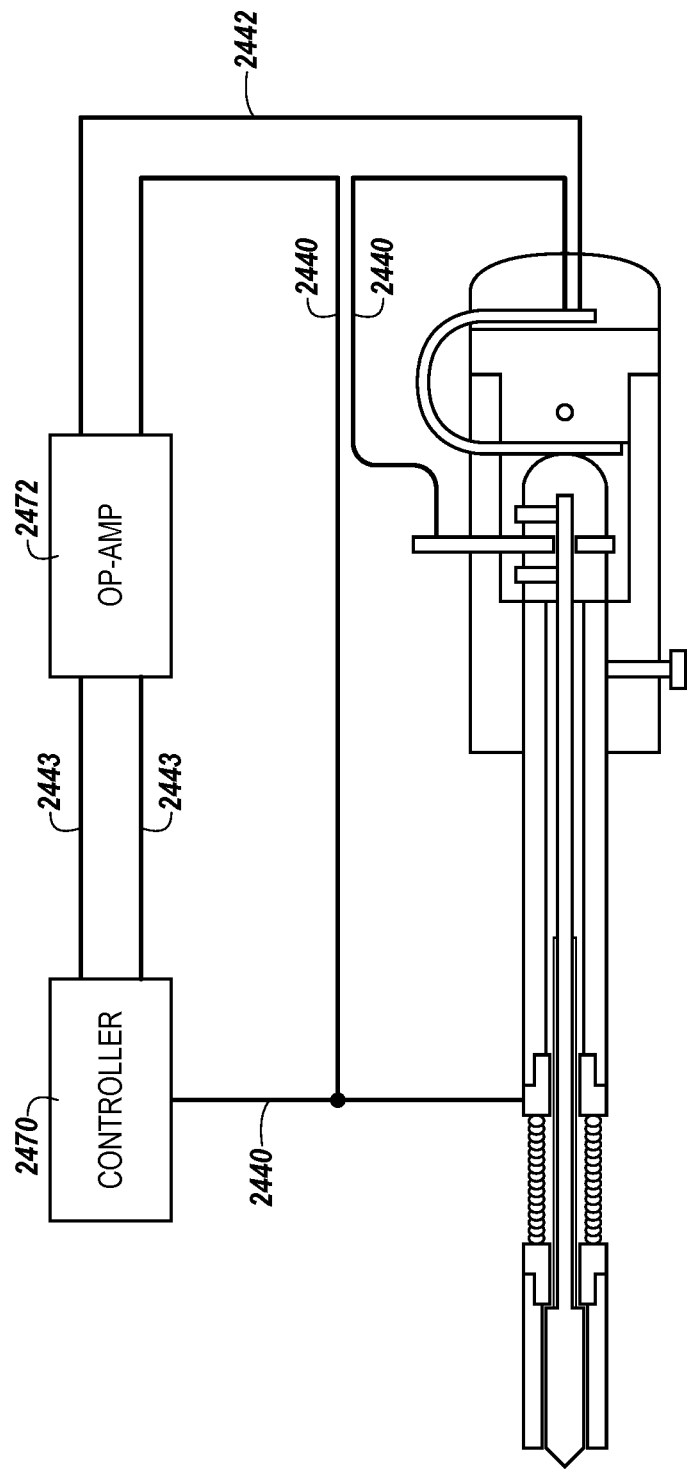
FIG. 24 is a system diagram including circuitry coupled to a probe contact and sensor of a tension measuring device in accordance with a number of embodiments of the present disclosure.

FIG. 24 is a system diagram including circuitry coupled to a probe contact and sensor of a tension measuring device in accordance with a number of embodiments of the present disclosure. The tension measuring device includes controller 2470 and op-amp 2472. The switch can be connected in series with the sensor. The output of the switch/sensor is sent to the op-amp 2472 and controller 2470 via connectors 2440. The amplified output from the op-amp 2472 is sent to the controller 2470 via connectors 2443. The controller 2470, which includes circuitry and/or a processor to process the signal periodically, for example every millisecond, and also provides a constant 5V power source for the sensor. Controller 2470 can include a circuitry and/or a processor configured to receive a number of inputs and make a number of calculations based on the number of inputs. To start the process of measuring the tension of the test object, controller can be reset and the probe can be pressed against the test object. The force sensed by the sensor can be measured every millisecond. When the switch is triggered to open, the recording of the force is initiated instantaneously. The force at this instant is noted and used to determine the tension. Controller 2470 can be configured to determine the tension from the measured force and can correlate the measured force to a standard, which can provide a numerical indication of the measured tension to the user in conventional units.

Figure 25A:
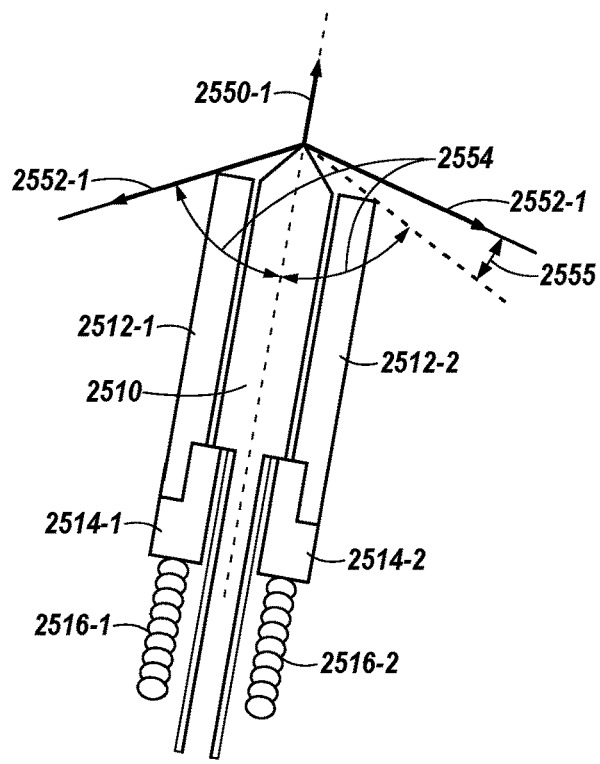
FIGS. 25A-25B are force vector diagrams on a tension measuring device at a non-orthogonal angle to a test object in accordance with a number of embodiments of the present disclosure.
Figure 25B:
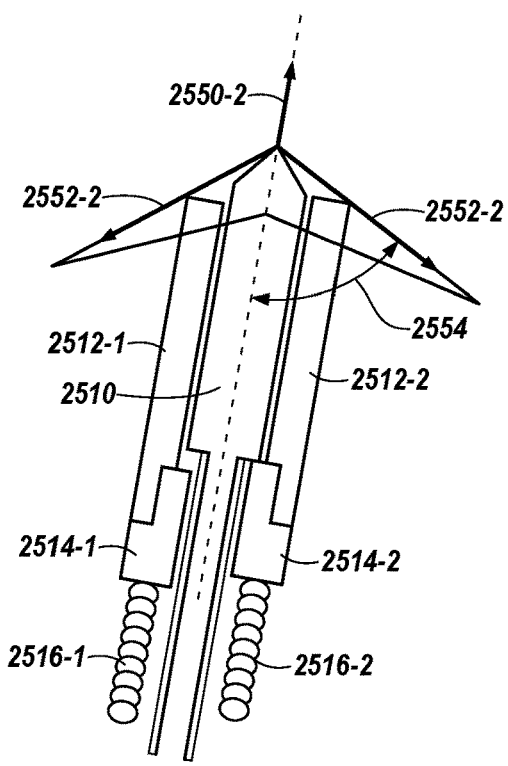

FIGS. 25A-25B are force vector diagrams on a tension measuring device at a non-orthogonal angle to a test object in accordance with a number of embodiments of the present disclosure. In FIG. 25A-25B, a tension measuring device includes two triggers. In a number of embodiments, a plurality of triggers can be used to obtain a plurality of force measurements that can be used to determine the local tension of a test object. The plurality of force measurements can be useful when the probe contacts that test object at a non-orthogonal angle.

A first trigger includes switch trigger 2512-1, switch trigger contact 2514-1, and switch trigger spring 2516-1. A second trigger includes switch trigger 2512-2, switch trigger contact 2514-2, and switch trigger spring 2516-2. Since the probe 2510 contacts the test object at angle 2555, the first trigger will be contacted by the test object first. When probe 2510 contacts the test object at angle 2555, the force 2550-1 on probe 2510 can correlate to tension 2552-1 when the test object contacts the switch trigger 2512-1 and a measurement can be taken. The probe 25510 can continue to displace the surface of the test object until it contacts switch trigger 2552-2. The force 2550-2 on probe 2510 can correlate to tension 2552-2 when the test object contacts the switch trigger 2512-2 and a measurement can be taken. The two measurements can be used to calculate a local tension in the test object based on the both forces 2550-1 and 2550-2 being functions of the tension, the angle between the probe and the switch triggers (θ), and angle 2555 (β) at which probe 2510 contacts the test object. The local tension can be calculated based upon the following equations:

$$F_1 = F(T, \theta, \beta)$$

$$F_2 = G(T, \theta, \beta)$$

The forces F1 and F2 are related to the tension 2552-1 and 2552-2 (T), the angle between the probe and the switch triggers (θ), and angle 2555 (β) at which probe 2510 contacts the test object. The two unknowns, tension (T) and (β), can be calculated using the formulas for $F_1$, corresponding to the force measured when switch trigger 2512-1 is contacted by the test object as shown in FIG. 25A, and $F_2$, corresponding to the force measured when switch trigger 2512-2 is contacted by the test object as shown in FIG. 25B.

Including a plurality of switches can mitigate planar non-orthogonality or asymmetric effects when using the tension measuring device. A number of embodiments can includes a switch configuration with an array of switches around the circumference of the probe to mitigate the effects of any axial non-orthogonality to the plane or surface to be measured.

Figure 26:
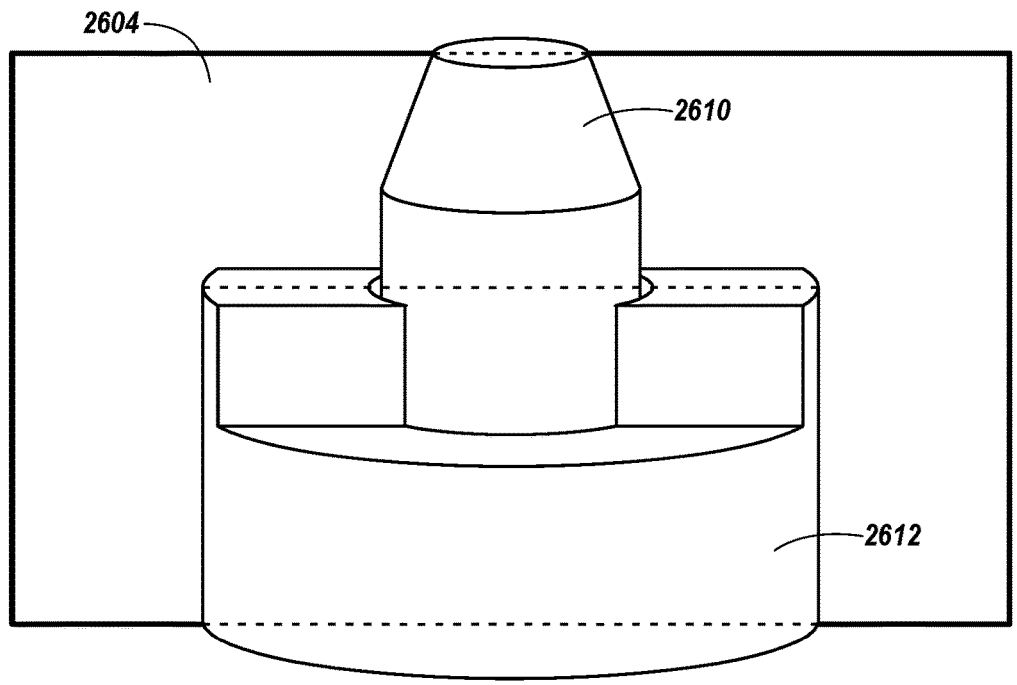
FIG. 26 is a schematic diagram illustrating measuring tension in a plane with a tension measuring device in accordance with a number of embodiments of the present disclosure.

FIG. 26 is a schematic diagram illustrating measuring tension in a plane with a tension measuring device in accordance with a number of embodiments of the present disclosure. In FIG. 26, the probe 2610 can be configured to measure tension in plane 2604. When switch trigger 2612 is aligned in the plane 2604 and the test object is contacted by the probe 2610 and the switch trigger 2612, a measurement of the tension in plane 2604 can be taken.

Figure 27:
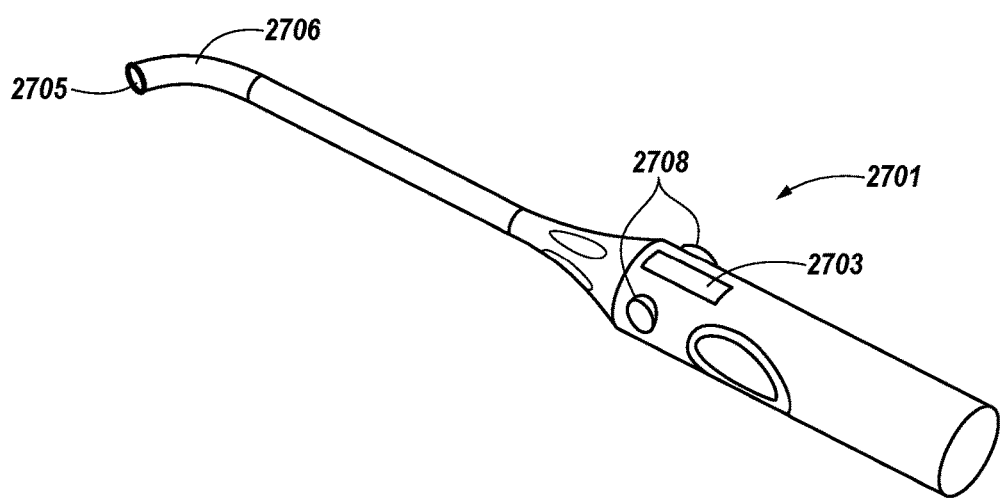
FIG. 27 is a perspective view of a tension measuring device in accordance with a number of embodiments of the present disclosure.

FIG. 27 is a perspective view of a tension measuring device in accordance with a number of embodiments of the present disclosure. Tension measuring device 2701 can be used for benchtop testing of any suitable material or it may be used in animal bodies to measure the tension of animal tissue such as a ligament from a quantifiable tactile response. When used by a surgeon, tension measuring device 2701 may give a surgeon information useful for patient feedback. Tension measuring device 2701 can be beneficial in that tension can be derived from a single force application and that tension may be determined locally. Further, local tension can be extrapolated to exterior or overall tension given dimensional data.

Tension measuring device 2701 may be used in orthopedic, cerebral, spinal, and ocular sensing; tumor determination based on local hardness/softness of tissue. In addition to animal tissue, the tension measuring device 2701 may be used to measure tension of films and webs and belts and/or to determine "softness" or "hardness" of materials.

Tension measuring device 2701 can include Bluetooth or any wireless communication protocol to send the measured data to a second location for remote access. The second location could be a monitor or other display, a computer, a network, a smart watch etc. The transmitted data also could include wireless audio. A display can be a device that can display a combination of characters to a user so that the user can visually see tension units of the material being measured. The wireless data may be synchronized with other health related metrics. The tension measuring device 2701 may be used alone and include heart rate and/or blood flow measurements. Tension measuring device 2701 can be used in conjunction with an endoscope, or may include an endoscope in its design. The probe end may be provided with a camera or a laser to ascertain the precise location of the probe end relative to the material-to-be-measured. Laser or optical fiber may run along the probe axis, and the camera may be hard wired to a monitor or the images may be sent there using air frequencies like Bluetooth. A laser source also may be disposed in the device handle. Compact electronics to allow for ergonomic design may be used. A processor may be programmed for various calibrations and correlations suitable for the application at hand. Further, inflated balloons that have varying wall thicknesses can be provided to illustrate different tensions in the wall; such can be detected with the present device. The device may be designed to emit a signal such as a noise or vibration to indicate a completed measurement, and it can emit a signal such as a noise or other indication when data has been recorded. Further, a fiber-optic video camera can be used to record the location before, during, and after carrying out a tension measurement.

Tension measuring device 2701 may include a housing that contains many of the components that comprise the device. The housing may be configured in the shape of a handle that is ergonomically fashioned to be comfortable in a person's hand. The handle may be ambidextrous in design to accommodate both right and left handed persons.

Tension measuring device 2701 can include a display 2703 that indicates the tension being measured and ergonomic switches 2708 to initialize and initiate measurements. An LCD display can be used to show measurement readings and/or the display may show the environment at the probe end. Various electrical components may be fitted onto a board located within the handle. Further, inertial measurement within the device can be used to identify and record instrument usage. A fiber optic pointer 2705 may be used to assist in identifying the proper location.

An omnidirectional tip 2706 may be used, having a position controlled by handle rotation. An omnidirectional tip 2706 is beneficial in that it can keep the display in the line of sight and yet have the tip point in any desired direction. Additionally, temperature and proximity sensors could be included in the tip 2706. Also. infrared (IR) sensors can be included for blood flow and heartrate measurements. In addition to being a stand-alone device, the tension measuring device 2701 could be integrated into automated/robotic systems. The tension measuring device 2701 or integrated individually or in plurality could be used to collect temporal data for the dynamic range of anatomical parts in patients.

Tension measuring device 2701 enables local tension measurements to be achieved. Tension measuring device 2701 can also be configured to provide regional tension measurements. The probe size, that is, its dimensions, for example, its diameter, and the width of the switch trigger may be adapted to allow for regional tensional readings. Tension measuring device 2701 can be scalable to various sizes and can be used to procedurally complement other arthroscopic/endoscopic tools. Tension measuring device 2701 allow for localized measurements for comparative evaluation of "hard" and "soft" entities within a single material. Tension measuring device 2701 can accumulate temporal information and the temporal tension data can be accumulated and characterized on patient's range of dynamic motion.

Figure 28A:
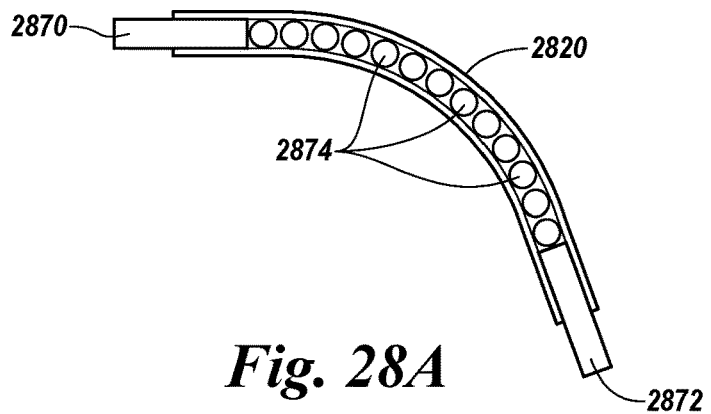
FIGS. 28A-28C are schematic diagrams of a flexible portion of a tension measuring device in accordance with a number of embodiments of the present disclosure.
Figure 28B:
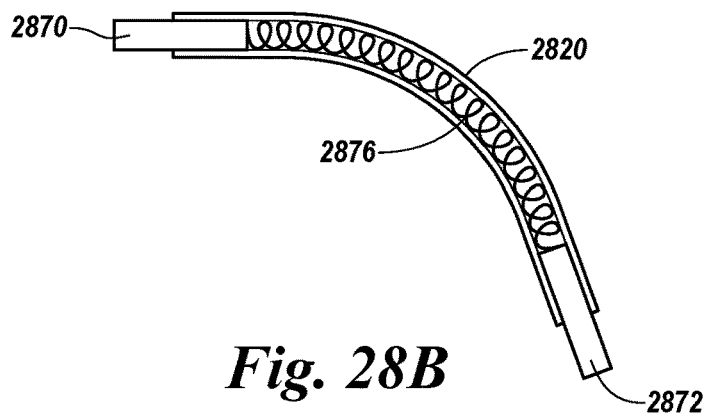
Figure 28C:
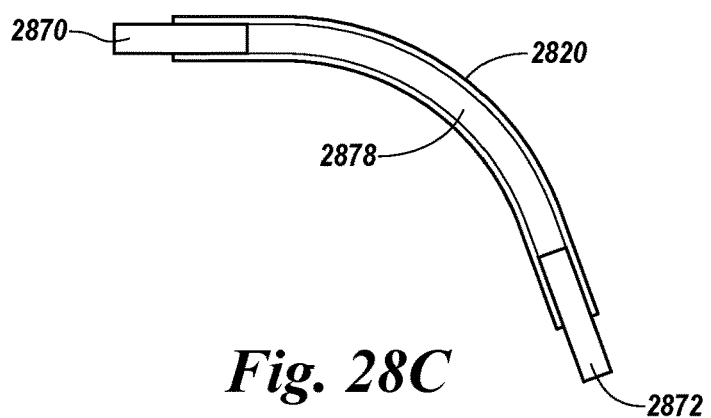

FIGS. 28A-28C are schematic diagrams of a flexible portion of a tension measuring device in accordance with a number of embodiments of the present disclosure. In FIG. 28A, probe enclosure 2820 can include a flexible portion that includes bearings 2874. Bearings 2874 can be coupled to rigid elements 2870 and 2872 and the force on probe can be transferred from rigid element 2870 through bearing 2874 to rigid element 2872. Bearing 2874 can be flexible, allowing the probe enclosure to bend and reach test objects.

In FIG. 28B, probe enclosure 2820 can include a flexible portion that includes spring 2876. Spring 2876 can be coupled to rigid elements 2870 and 2872 and the force on probe can be transferred from rigid element 2870 through spring 2876 to rigid element 2872. Spring 2876 can be flexible, allowing the probe enclosure to bend and reach test objects.

In FIG. 28C, probe enclosure 2820 can include a flexible portion that includes fluid 2878. Fluid 2878 can be sealed within probe enclosure 2820 and can be coupled to rigid elements 2870 and 2872 and the force on probe can be transferred from rigid element 2870 through fluid 2878 to rigid element 2872. Fluid 2878 can allow the probe enclosure to flex, allowing the probe enclosure to bend and reach test objects.

Figure 29:
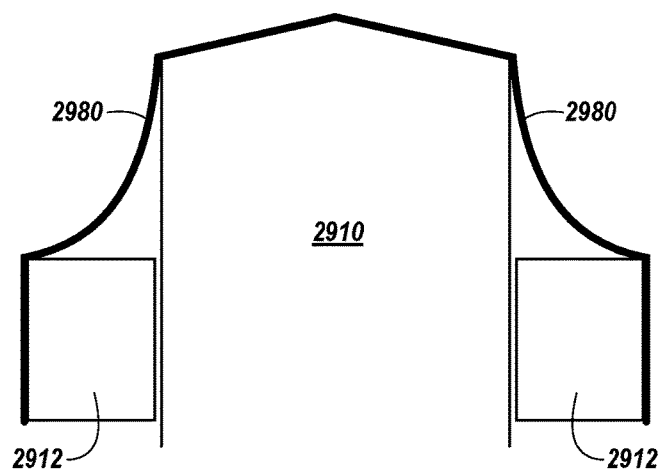
FIG. 29 is a section view schematic diagram of a contact end portion of a tension measuring device including a protective enclosure in accordance with a number of embodiments of the present disclosure.

FIG. 29 is a section view schematic diagram of a contact end portion of a tension measuring device including a protective enclosure in accordance with a number of embodiments of the present disclosure. In FIG. 29, a contact end of portion of a tension measuring device can include a protective enclosure 2980 over probe 2910, switch trigger 2912, and probe enclosure (not shown), among other portions of the tension measuring device. Protective enclosure 2980 can be a compliant film or prophylactic cover and can be disposable, so that multiple protective enclosures can be installed and removed for repeated sterile use of the tension measuring device.

Figure 30:
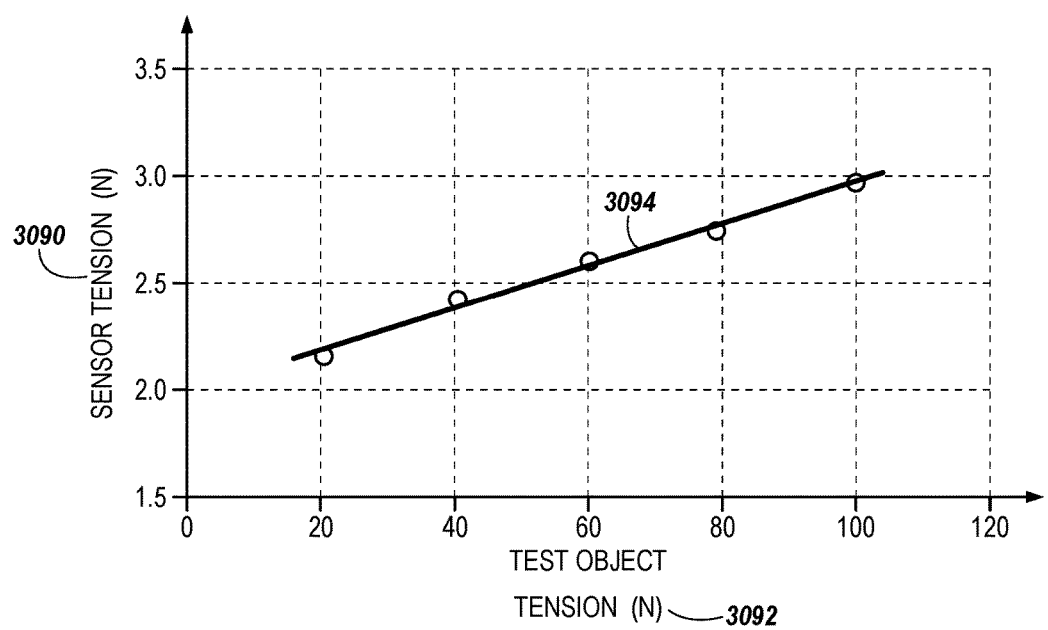
FIG. 30 is a graph illustrating sensor tension of a tension measuring device and test object tension in accordance with a number of embodiments of the present disclosure.
Figure 31:
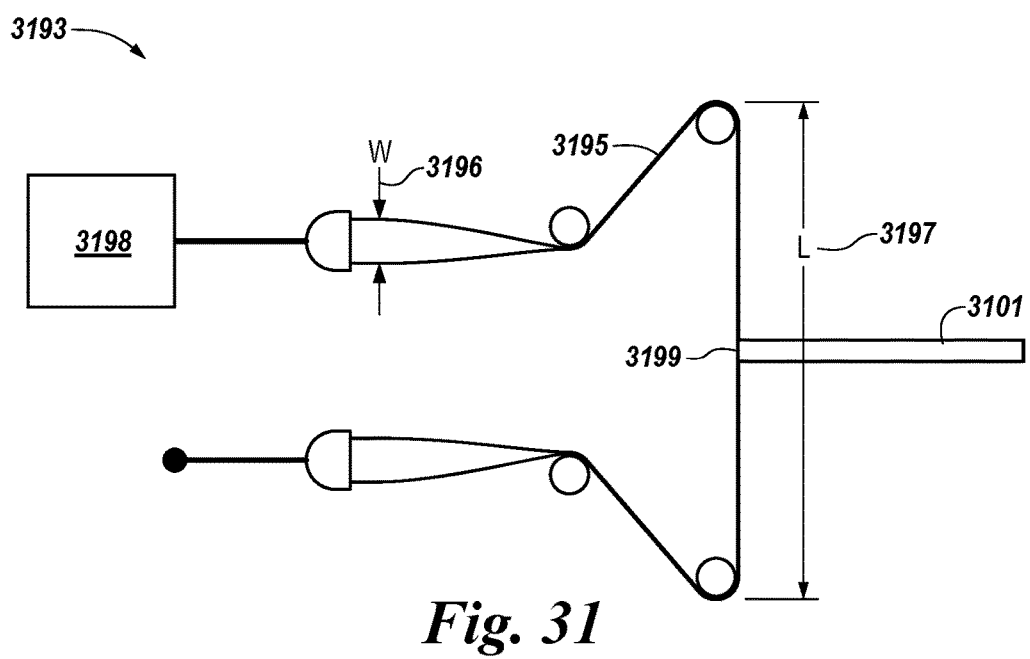
FIG. 31 illustrates a test configuration illustrating a tension measuring device performing a measurement on a test object.

FIG. 30 is a graph illustrating sensor tension of a tension measuring device and test object tension in accordance with a number of embodiments of the present disclosure. In FIG. 30, the correlation between the tension measured by the tension measuring device 3090, which is the local tension in the test object, and the overall tension in the test object 3092. The correlation 3094 between the tension measured by the tension measuring device 3090 and the overall tension in the test object 3092 is linear. As shown in FIG. 31, given the dimensions (e.g., the length (L) 3197 and the width (W) 3196 of the test object, the overall tension in the test object 3092 can be determined using parametric analysis. In the example of FIG. 31, the overall test object tension is measured by a force gage 3198 and the sensor tension is measured at the location 3199.

FIG. 31 illustrates a test configuration illustrating a tension measuring device performing a measurement on a test object. In FIG. 31, the test object 3195 can be placed in a test apparatus 3193. Test apparatus 3193 can include a force gage 3198 and a number of elements that hold the test object 3195 in tension on the test apparatus 3193. A tension measuring device 3101 can measure the local tension in test object 3195 at location 3199. The local tension in test object 3195 can correlate to the overall tension in the test object 3195 based upon the length (L) 3197 and the width (W) 3196 of the test object 3195. The correlation between the local tension at location 3199 measured by the tension measuring device 3101 and the overall tension as measured by force gage 3198 is shown in the graph in FIG. 30. A correlation between local tension and overall tension based upon the length (L) and the width 3196 of the test object for each particular type test object can be determined using parametric analysis.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A tension measuring device, comprising:
   a probe configured to exert a force upon a test object at a particular location;
   a sensor that detects the force that the probe exerts upon the test object; and
   a switch that signals the sensor indicating the test object has been displaced a particular distance, such that the sensor measures the force at a time when the test object has been displaced the particular distance and wherein a switch trigger contact is biased to be coupled to the probe until the test object has been displaced the particular distance.

2. The device of claim 1, wherein the force measured by the tension measuring device correlates to a local tension in the test object at the particular location.

3. The device of claim 1, wherein the switch signals the sensor indicating the test object has been displaced the particular distance and a particular angle between the probe and a switch trigger is reached when test object exerts a force on the switch trigger of the switch to move the switch trigger and electrically decouple the switch trigger contact of the switch from the probe.

4. The device of claim 1, wherein the particular distance is a shortest distance between a plane orthogonal to an end of the probe and an end of a switch trigger when an angle between the end of the probe and the end of the switch trigger is the particular angle.

5. The device of claim 1, wherein the probe includes a shaft and wherein a switch trigger annularly surrounds a portion of the shaft.

6. The device of claim 5, wherein the probe is electrically conductive and wherein the switch trigger is not electrically conductive.

7. The device of claim 1, wherein the sensor is selected from the group consisting of a hall effect sensor, a capacitive sensor, a proximity sensor, a magnetic sensor, a piezoresistive sensor, or an optical sensor.

8. The device of claim 1, wherein the switch is selected from the group consisting of an electrically conductive switch, a proximity switch, a capacitive switch, a magnetic switch, an optical switch, or a hall effect switch.

9. The device of claim 1, wherein the device includes a bendable shaft and a pointer configured to project a visual target on the test object.

10. The device of claim 1, wherein the device further includes a housing that comprises a handle for holding the device in a user's hand.

11. The device of claim 10, wherein the handle includes wireless, visual, and/or audio communication.

12. The device of claim 1, wherein an end of the device that contacts the test object includes a protective enclosure to isolate the device from the test object.

13. A method for measuring the tension of a test object, comprising:
    displacing the test object a particular distance by pressing a probe against the test object at a first location to exert a force upon the test object;
    signaling the test object has been displaced the particular distance in response to the test object contacting a switch;
    measuring the force exerted upon the test object in response to signaling the test object has been displaced the particular distance; and
    correlating the measured force to a local tension at the first location of the test object.

14. The method of claim 13, wherein displacing the test object the particular distance includes only contacting the test object at the particular location.

15. The method of claim 13, further including correlating the local tension in the test object to an overall tension of the test object based on dimensions of the test object.

16. A method for measuring the tension of a test object, comprising:
    engaging a test object with a probe of a tension measuring device at a particular angle, wherein engaging the test object with the probe exerts a force upon the test object; and
    measuring a plurality of forces exerted upon the test object each time the probe has displaced the test object a corresponding distance in response to the test object contacting one of a plurality of switches when the test object is displaced the corresponding distance associated with the plurality of switches.

17. The method of claim 16, further including correlating the plurality of forces to a local tension in the test object.

18. The method of claim 16, further including correlating the plurality of forces to an overall tension in the test object based on dimensions of the test object.

* * * * *